United States Patent [19]

Green

[11] Patent Number: 5,075,059

[45] Date of Patent: Dec. 24, 1991

[54] METHOD FOR FORMING PANEL DOOR WITH SIMULATED WOOD GRAINS

[75] Inventor: F. Richard Green, Hamilton, Ohio

[73] Assignee: Pease Industries, Inc., Fairfield, Ohio

[21] Appl. No.: 559,253

[22] Filed: Jul. 30, 1990

Related U.S. Application Data

[63] Continuation-in-part of Ser. No. 542,173, Jun. 22, 1990, abandoned.

[51] Int. Cl.$^5$ .......................... B05D 1/00; B29C 41/32
[52] U.S. Cl. ..................................... 264/129; 264/162; 264/219; 264/257; 427/290; 427/334; 427/368; 427/371; 427/393.5; 427/407.3
[58] Field of Search ............... 427/290, 334, 368, 371, 427/389.9, 393.5, 407.3, 412.1, 417, 340; 264/73, 74, 137, 162, 219, 297.1, 129, 162, 132, 257, 258, 193

[56] References Cited

U.S. PATENT DOCUMENTS

| | | | |
|---|---|---|---|
| 1,908,263 | 5/1933 | Loetscher | 428/81 |
| 2,849,758 | 9/1958 | Plumley et al. | 52/309.15 |
| 3,081,159 | 3/1963 | Brown | 427/371 |
| 3,167,823 | 2/1965 | Palfey | 52/172 |
| 3,299,595 | 1/1967 | Munk | 52/309.13 |
| 3,386,209 | 6/1968 | Starcevic | 49/501 |
| 3,498,001 | 3/1970 | MacDonald | 49/501 |
| 3,546,841 | 12/1970 | Smith et al. | 428/71 |
| 3,772,241 | 11/1973 | Kroekel | 523/523 |
| 3,780,472 | 12/1973 | Biebuyck | 49/501 |
| 3,785,103 | 1/1974 | Turner | 52/309.11 |
| 3,786,609 | 1/1974 | Difazio | 52/802 |
| 3,847,646 | 11/1974 | Daunheimer et al. | 427/368 |
| 3,896,199 | 7/1975 | Michaelis | 264/129 |
| 3,950,894 | 4/1976 | DiMaio | 49/501 |
| 3,970,502 | 7/1976 | Turner | 156/310 |
| 4,114,319 | 9/1978 | Governale | 49/488 |
| 4,141,944 | 2/1979 | Anstadt et al. | 264/45.5 |
| 4,148,157 | 4/1979 | Franc | 44/501 |
| 4,152,876 | 5/1979 | Seely | 52/455 |
| 4,221,758 | 9/1980 | Burkey et al. | 264/293 |
| 4,236,365 | 12/1980 | Wheeler | 52/455 |
| 4,265,067 | 5/1981 | Palmer | 52/309.9 |
| 4,367,110 | 1/1983 | Yoshikawa | 264/219 |
| 4,550,540 | 11/1985 | Thorn | 52/309.4 |
| 4,720,951 | 1/1988 | Thorn et al. | 52/208 |
| 4,748,780 | 6/1988 | Vinther | 52/309.3 |
| 4,752,517 | 6/1988 | Beitel | 428/122 |
| 4,791,168 | 12/1988 | Salatin et al. | 427/412.1 |
| 4,850,168 | 7/1989 | Thorn | 52/207 |
| 4,864,789 | 9/1989 | Thorn | 52/309.9 |
| 4,901,493 | 2/1990 | Thorn | 52/309.9 |

FOREIGN PATENT DOCUMENTS

| | | |
|---|---|---|
| 493777 | 6/1953 | Canada . |
| 722017 | 3/1932 | France . |
| 807749 | 1/1937 | France . |
| 685777 | 3/1965 | Italy . |
| 2051177 | 1/1981 | United Kingdom . |

Primary Examiner—Willard Hoag
Attorney, Agent, or Firm—Wood, Herron & Evans

[57] ABSTRACT

A cost effective method for realistically simulating a wood grain appearance on a door skin used to form a panel door includes compression molding a fiber reinforced polyester door skin having an outer surface with "closed" areas dense with deep grains and "open" areas with a generally lesser concentration of deep grains, the surface further having a predetermined surface roughness. The outer surface also has shallow grains in trim areas that are steeply angled with respect to the substantially planar door skin. A mixture of artist's oil cut 1:1 with mineral spirits on a fluid ounce basis is then sprayed onto the outer surface after molding. After twenty minutes, the mixture is rubbed in, and the door skin is dried vertically in a forced air oven for one hour at about 120° F.

11 Claims, 1 Drawing Sheet

METHOD FOR FORMING PANEL DOOR WITH SIMULATED WOOD GRAINS

This application is a continuation-in-part application based upon applicant's U.S. Ser. No. 07/542,173, filed on June 22, 1990 now abandoned and entitled "Improved Method For Forming Simulated Wood Grain Panel Door."

FIELD OF THE INVENTION

This invention relates to a cost effective method for providing a realistic wood grain appearance on a molded door skin used in a panel door.

BACKGROUND OF THE INVENTION

Panel door assemblies often include external door skins with surfaces that are not made from wood, but are compression molded to simulate a wood appearance. The compression molds used to produce these door skins often provide for simulated wood grains or other discontinuities in the exterior surface of the skin, thereby to more realistically simulate a wood grain appearance and to improve adherence of subsequently applied varnish or stain to the external surface of the door skin.

The molded skins for panel doors generally include panel sections that are bordered by decorative trim that is either embossed or bossed with respect to the outer surface of the skin. There are limitations associated with compression molding wood grains into a door skin. Grain depths have generally been limited to about 3-4 thousandths of an inch, due to "undercutting" that sometimes occurs when the skin is removed from the mold. Additionally, when removing the door skin from the mold, relatively deep grains formed at right angles to steeply embossed or bossed portions of the trim deform upon contact with the mold half during removal. In order to solve this problem, many door skin manufacturers mold the skins with reduced grain depth around the panels. The grains generally are formed in the mold by acid etching a wax resist.

In order to facilitate adhesion of subsequent coatings it is known to "bead blast" the mold surface with glass beads prior door skin forming. This textures the skin during molding.

After the molding step, a stain may be applied to the surface to create a natural wood grain look. However, it has been found that artist's oil coats the door skin more evenly than most stains and provides a much better, or more realistic, wood grain appearance. Unfortunately, artist's oil is relatively expensive, it must be wiped into the door skin subsequent to application, and it requires a long time to dry, once applied. Typically, air drying takes about 24 hours.

As a final step, the exterior surface of the door skin may be coated with a clear urethane finish or an acrylic top coat.

While the above-described method of pretreating the compression molds used in door skin formation has proved satisfactory, there is a perceived need for improvement in simulating a wood grain on the outer surface of a door skin.

It is an object of the invention to provide a molded door skin that more realistically simulates a wood grain appearance for a panel door.

It is another object of the invention to reduce the relative time and cost generally required to achieve a simulated wood grain appearance for a door skin used in a panel door.

SUMMARY OF THE INVENTION

This invention contemplates a method which includes a first step of compression molding fiber reinforced polyester door skins with closed areas dense with deep grains, open areas with a generally lesser concentration of deep grains and reduced depth grains adjacent steeply angled trim areas. The open areas also have a predetermined roughness, this predetermined roughness and the grains being provided by the mold half used in compression molding.

In the subsequent steps, the molded door skin is sprayed with a mixture of artist's oil cut 1:1 with mineral spirits on a fluid ounce basis. The word "cut" means "mixed" or "diluted." After twenty minutes, the sprayed mixture is rubbed into the external surface, and the door skin is then placed vertically in a forced air oven for about one hour at about 120° F. As a final step, a standard urethane top coat may be applied to the dried stain finish.

By providing deep grains of varying density over most of the door skin surface, but reduced grain depths adjacent to steeply embossed or bossed trim sections, the external surfaces of the panel door more realistically simulate a wood grain appearance, while the reduced depth of the grains in steeply angled areas minimizes risk of deformation during mold release.

This invention provides a compression mold half that produces deeper grains than previously thought to be possible. This is done by hand applying a wax resist to the compression mold before etching to produce deep grains that do not undercut the door skin material during removal of the skin from the mold. To produce the predetermined roughness for the door skin, the mold is bead blasted with a mixture of aluminum oxide beads and glass beads to provide a textured surface or a mechanical bonding surface for subsequently applied coating. In a sense, bead blasting provides an enhanced porosity for the molded surface of the door skin. The combination of bead blasted open areas and closed areas produces a surface texture to which subsequently sprayed coatings will readily adhere.

Because the artist's oil is cut 1:1 with mineral spirits on a fluid ounce basis, and because mineral spirits generally cost less than artist's oil, the sprayed mixture coats the door skin at a lower cost per unit surface area. This results in a lower priced panel door. Additionally, this method eliminates the previously required need to wipe excess artist's oil from the door skin prior to drying.

According to another aspect of the invention, this method also permits a significant reduction in drying time. Use of a forced air oven reduces drying time for this door skin to about 1-2 hours. Because drying time is reduced, production capacity for a given time period may be increased, thereby further lowering the cost of the panel door.

These and other features of the invention will be more readily understood in view of the following detailed description and the drawings.

DETAILED DESCRIPTION OF THE DRAWINGS

Figure 1:
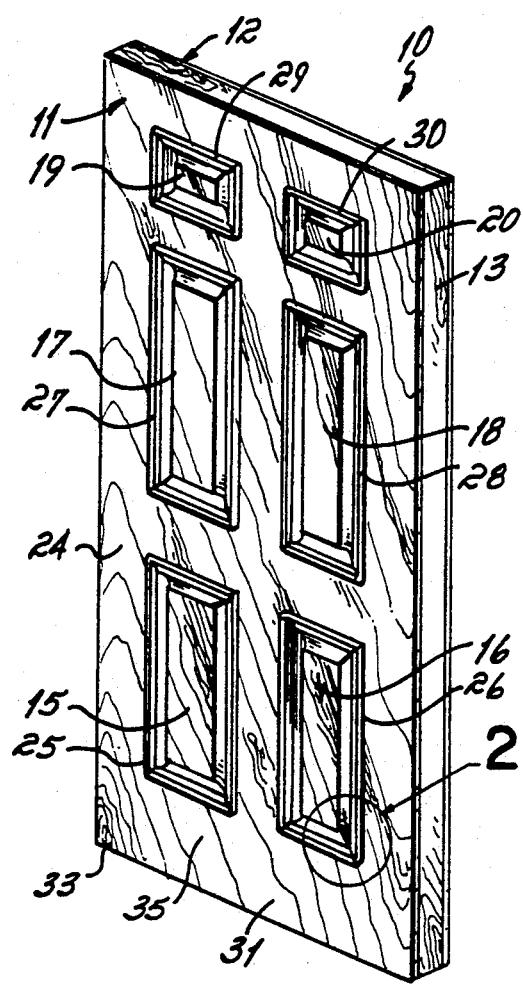
FIG. 1 is a perspective view of a panel door made from compression molded, prefinished fiber reinforced polyester door skins in accordance with a preferred embodiment of the invention.
Figure 2:
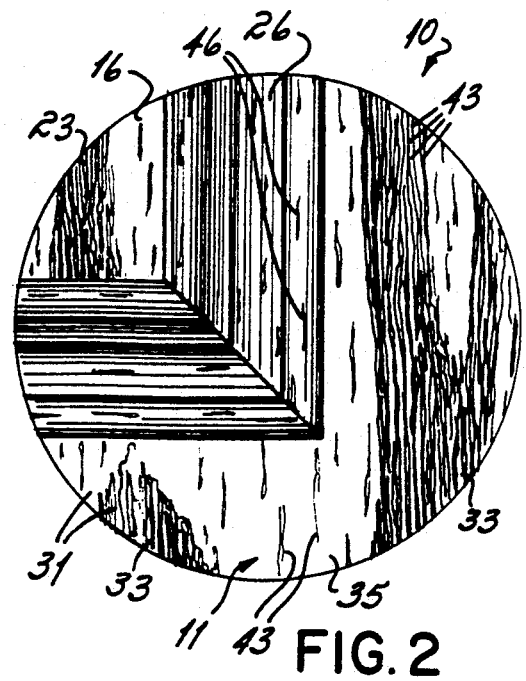
FIG. 2 is an enlarged view of the encircled portion shown in FIG. 1.

FIG. 1 shows a panel door 10 made from compression molded door skins 11 and 12 prefinished in accordance with a preferred embodiment of the invention. Door skins 11 and 12 sandwich a core material 13 therebetween. Panel door 10 has a plurality of rectangularly shaped panels, designated by numerals 15, 16, 17, 18, 19 and 20. These panels have peripheral borders 25, 26, 27, 28, 29 and 30, respectively, each of the borders having a design that is both relieved and raised (i.e., bossed and embossed) with respect to the external surface of skin 11. Preferably, the outermost portions of the borders are raised with respect to the outwardly directed door skin 11 surface.

Skins 11 and 12 are preferably molded from fiber reinforced plastic, the fiber reinforcement provided by chopped fiberglass pieces preferably ½"–1¼" in length with a predetermined diameter. The molded fiberglass reinforced plastic is preferably made of calcium carbonate (45–50% by weight), fiberglass (20–40% by weight), polyester resin (10–20% by weight), zinc stearate (1% by weight) and pigment or other materials may be substituted.

An external or outwardly directed surface 31 of door skin 11 includes areas 33 with a high concentration of deep grain depth, the depth preferably being in the range of about 0.005" to 0.0055". These areas are referred to as "closed" areas. Other "open areas" 35 on the surface 31 have a generally lesser concentration of deep grains. The entire surface also has a predetermined roughness that is achieved by bead blasting the compression mold with a #4 mixture of glass beads and aluminum oxide beads.

Figure 3:
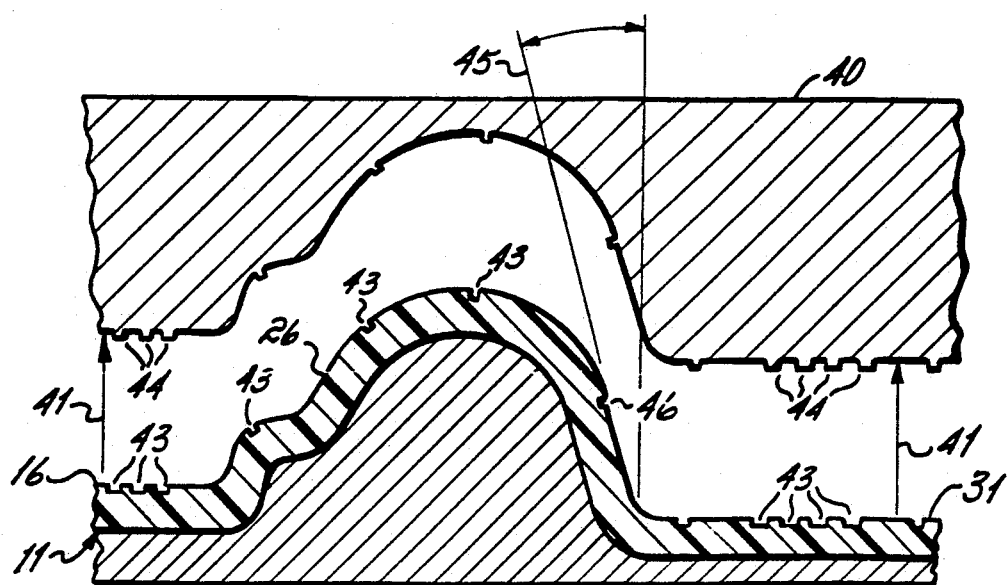
FIG. 3 is a partial cross-sectional view showing a portion of a compression molded door skin as it is released from a forming mold.

FIG. 3 shows a cross-sectional view of an upper mold half 40 of a compression mold as it is removed from skin 11, which remains within a lower mold half 42 until subsequent ejection therefrom. Removal of mold half 40 is indicated by directional arrows 41. Exterior surface 31 of door skin 11 includes deep grains 43 directed outwardly. Surface areas 33 are closed areas of high density deep grains 43, while surface areas 35 designate open areas with a relatively low concentration of deep grains 43. The deep grains 43 are formed by outward protrusions 44 in upper mold half 40. Preferably the mold halfs are of P20 steel.

Before acid etching to produce the grains, wax is preferably hand applied to produce a mask. Hand application enables the grains to be formed to a deeper depth because there is less risk of undercutting during removal of the door skin from the mold. This door process also enables some "ticking" to be produced in the open areas.

Along areas of the door skin 11 where the border is steeply angled relative to surface 31, having a depth of about 0.0015–0.0020". This depth dimension is measured as a perpendicular distance from a tangent line along the surface 31. In FIG. 3, molded shallow grain 46 lies on tangent line 45, which is angled at about 15° from perpendicular. Reduced depth grains or shallow grains 46 are provided in all steep areas, as those areas where the angle of a tangent line would be offset less than 15 from perpendicular (i.e., tangent lines of 75°–90° with respect to surface 31).

The molding of deeper grains on all portions of the border produces a door skin that more realistically simulates a wood grain. Nevertheless, because of the reduced depth at steep areas, this realistic wood grain appearance is achieved with only a minimum risk of skin or grain deformation when the mold half 40 is removed from the skin 11. If desired, the other surface of the skin, i.e., the inwardly directed surface, may be molded with a roughened texture to promote adhesion to the core material used to form the panel door.

After the door skin 11 has been molded in the manner described above, a 1:1 mixture of artist's oil and mineral spirits is sprayed onto external surface 31. Preferably, the mixture is air sprayed at about 35 p.s.i. Applicant has found that a Grayco sprayer with an orifice of 20 thousandths and 270° spray pattern has worked well.

The 1:1 mixture is based upon a fluid ounce basis. Although any one of a variety of artist's oils would probably prove suitable, applicant has found "Liquiter," manufactured and sold by Binney & Smith, to be particularly suitable. By cutting the artist's oil with mineral spirits a number of cost effective benefits are achieved. Namely, the cost of coverage for unit surface area is reduced because mineral spirits generally cost less than artist's oil. Secondly, cutting reduces the viscosity of the mixture, thereby facilitating even coating and promoting better adherence to the door surface 31.

Twenty minutes after spraying, the mixture is rubbed into door surface 31 as it is wiped off. Subsequently, the door skin is placed vertically in a forced air oven for about one hour at about 120° F. Preferably, forced air is provided at about 300 cubic feet per minute during drying.

Formerly, when using artist's oil alone, it was necessary to separately wipe off excess oil after the rubbing step. Applicant has found that, in most instances, a separate wiping step is no longer necessary, so that the number of required labor steps is reduced and the cost of producing the door skin is further decreased.

Finally, as mentioned above, when using artist's oil alone an open air drying time of about 24 hours is required. This method is more efficient from a production standpoint because drying time is reduced to about one hour. As a final step, a standard urethane top coat may be applied to the dried stain finish.

This combination of steps produces a molded door skin that more realistically simulates a wood grain finish at a reduced cost, and it does so in a manner which is less expensive than prior, less successful methods.

While the above description constitutes a preferred embodiment of this inventive method, it is to be understood that the invention is not limited thereby and that in light of the present disclosure of the invention, various other alternative embodiments will be apparent to a person skilled in the art. Accordingly, it is to be understood that changes may be made without departing from the scope of the invention as particularly set and claimed.

I claim:

1. A method for forming a simulated wood grain panel door comprising the steps of:
    molding a door skin from fiberglass reinforced plastic, the skins having panels bordered by raised trim and one surface of the skin having closed areas dense with deep grains, open areas of a relatively lower concentration of deep grains, and steeply angled areas of shallow grains, said one surface also provided with a predetermined roughness;

spraying a mixture of artist's oil and mineral spirits onto said first surface; and rubbing said mixture into said first surface twenty minutes after said spraying step and then placing the skin in a forced air oven for about one hour at about 120° F.

2. The method of claim 1 wherein the deep grains have a depth of about 0.005" to 0.0055".

3. The method of claim 1 wherein the shallow grains have a depth in the range of about 0.0015–0.0020".

4. The method of claim 1 wherein the mixture of artist's oil and mineral spirits is 1:1 on a fluid ounce basis.

5. The method of claim 1 further including the step of:

wiping said mixture from said first surface after said rubbing step.

6. The method of claim 1 wherein said skin is placed in the forced air oven in a vertical orientation.

7. The method of claim 1 and further comprising the step of:

applying a top coat of urethane to said first surface after said placing step is completed.

8. The method of claim 1 wherein said grains are provided by:

hand applying a wax resist to a compression mold; and etching the mold.

9. The method of claim 1 wherein said predetermined roughness is provided by:

bead blasting a compression mold with a #4 mixture of glass beads and aluminum oxide beads prior to said compression molding step.

10. The method of claim 1 wherein said door skin is compression molded.

11. A method for forming a simulated wood grain panel door comprising the steps of:

compression molding a door skin from fiberglass reinforced plastic, the skins having panels bordered by raised trim and one surface of the skin having closed areas dense with deep grains and open areas of a relatively lower concentration of deep grains, and steeply angled areas of shallow grains, said one surface also provided with a predetermined roughness, the deep grains having a depth of about 0.005" to 0.0055" and the shallow grains having a depth in the range of about 0.0015–0.0020";

spraying a mixture of artist's oil and mineral spirits onto said first surface, the mixture being 1:1 on a fluid ounce basis; and rubbing said mixture into said first surface twenty minutes after said spraying step and then placing the skin in a forced air oven for about one hour at about 120° F.; and applying a top coat of urethane to said first surface after said placing step is completed.

* * * * *

UNITED STATES PATENT AND TRADEMARK OFFICE
CERTIFICATE OF CORRECTION

PATENT NO. : 5,075,059
DATED : December 24, 1991
INVENTOR(S) : F. Richard Green

It is certified that error appears in the above-identified patent and that said Letters Patent is hereby corrected as shown below:

Column 3, line 29, after pigment, insert --(0-1% by weight) although other variations of these--.

Column 3, line 61, after 31, insert --shallow grains 46 are formed, the shallow grains 46--.

Column 4, line 1, insert "°" after 15.

Signed and Sealed this

Twenty-second Day of June, 1993

Attest:

MICHAEL K. KIRK

*Attesting Officer*   Acting Commissioner of Patents and Trademarks